UNITED STATES PATENT OFFICE.

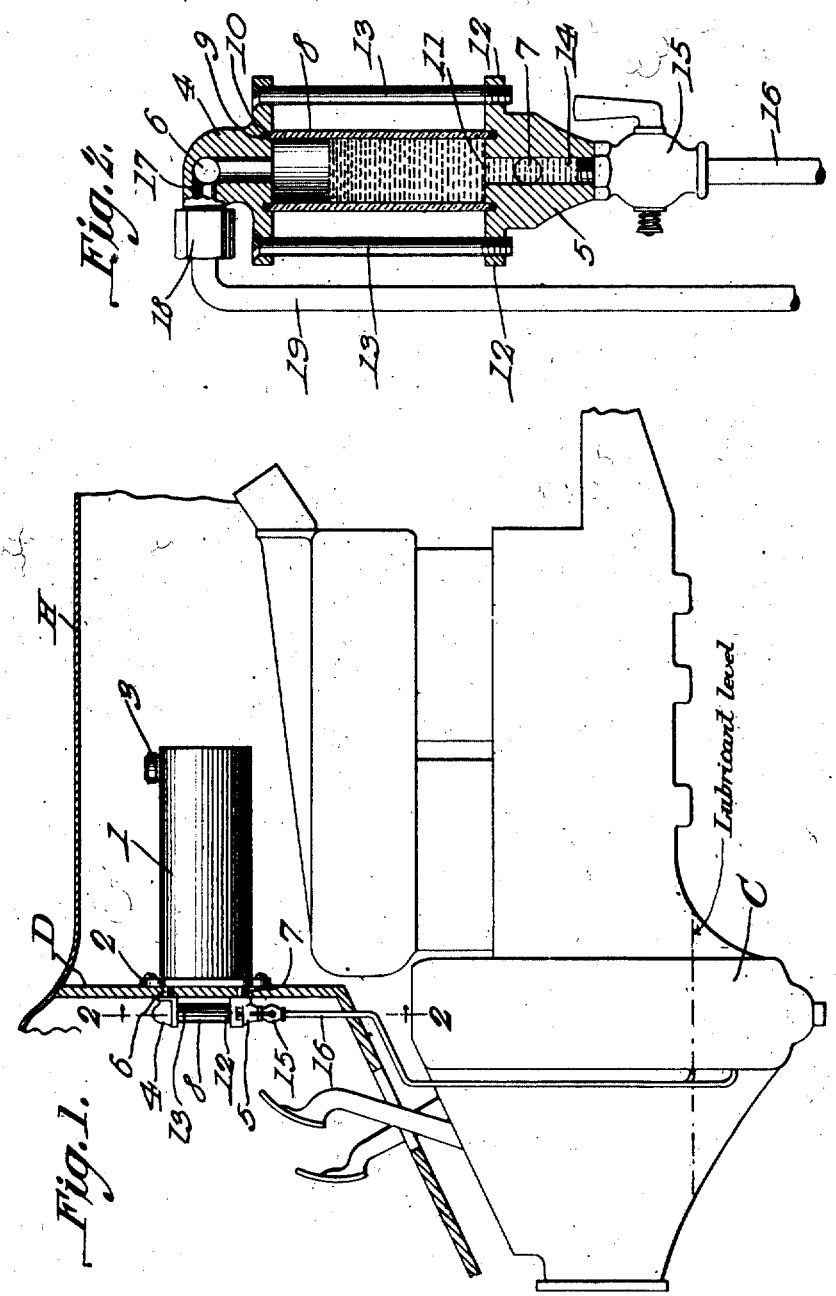

JAMES C. WILLIAMSON, OF CORDELE, GEORGIA.

LUBRICANT-SUPPLYING DEVICE FOR ENGINES.

1,251,606.  Specification of Letters Patent.  Patented Jan. 1, 1918.

Application filed June 20, 1917. Serial No. 175,903.

*To all whom it may concern:*

Be it known that I, JAMES C. WILLIAMSON, a citizen of the United States, residing at Cordele, in the county of Crisp and State of Georgia, have invented a new and useful Lubricant-Supplying Device for Engines, of which the following is a specification.

The present invention relates to a lubricant supplying device for internal combustion engines, and aims to provide novel and improved means attachable to the crank casing or other lubricant holding receptacle for supplying lubricant thereto, in order that the lubricant level within the casing can be maintained, it being a common source of trouble with automobile engines that lubricant must be frequently poured into the crank casing to avoid the heating of the engine, whereas with the present invention a reserve supply of lubricant contained in a tank is permitted to flow automatically into the crank casing up to a certain level therein.

It is the object of the invention to provide a lubricant supplying device of the nature indicated which can be readily installed in various automobiles, which is simple, compact and inexpensive in construction, and which will perform its office in a thoroughly satisfactory and practical manner.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:

Figure 1 is a side elevation showing the device as applied.

Fig. 2 is an enlarged sectional detail on the line 2—2 of Fig. 1.

In carrying out the invention, there is provided a tank or reservoir 1 for holding a reserve supply of lubricant, and this tank is supported at any suitable point within the automobile at a suitable height, for the flow of lubricant therefrom by gravity into the crank casing C. As illustrated, the tank 1 is disposed horizontally underneath the hood H, and the tank is provided at its rear end with outturned ears or flanges 2 fastened by means of screws or the like to the forward side of the dash D, whereby the tank is supported by the dash and projects forwardly over the engine. The top of the tank 1 is provided with a removable cap or plug 3 to enable the tank to be readily filled. This tank can be supported in any suitable manner, according to the circumstances and conditions.

The device includes a gage and connections, including upper and lower heads or castings 4 and 5 preferably bearing against the dash D at the rear side thereof, and said heads are connected by the respective nipples 6 and 7 with the rear end of the tank 1 adjacent to the upper and lower portions thereof, respectively. These nipples 6 and 7 can be connected to the heads and tank in any suitable manner or other suitable connections between the heads and tank can be provided according to the location of the parts. Between the heads 4 and 5 is a vertical glass gage tube 8 having its ends disposed within annular grooves 9 with which the heads are provided in their adjacent faces, gaskets 10 being seated in said grooves to prevent leakage. The heads 4 and 5 have central apertures or passages 11 communicating with the ends of the tube 8 and with the nipples 6 and 7, whereby the lubricant will flow by way of the nipple 7 and lower head 5 into the tube 8, thereby maintaining the lubricant at the same level in the tube 8 as in the tank, in order that the operator by observing the gage can readily note the amount of oil in the tank. The heads 4 and 5 have outstanding ears 12, and eye bolts 13 extend through the ears of one head and threadedly engage the ears of the other head, the heads of the bolts seating against the first mentioned ears, whereby to clamp the heads against the ends of the tube 8, and hold the parts assembled. The lower head 5 has a depending nipple or connection 14 communicating with the nipple 7 and to which a manually-controlled valve 15 is connected, a pipe or tube 16 being in turn connected to the valve 15 and to the lower portion of the casing C, for the flow of lubricant by gravity from the tank 1 to the casing C.

In order to automatically stop the flow of lubricant into the casing C from the tank when the lubricant reaches a predetermined level in the casing, the upper head 4 has a nipple or connection 17 to which is connected by means of a union or coupling 18, a pipe or tube 19, which extends downwardly and is connected to the casing C at the normal lubricant level.

In operation, when the valve 15 is opened, should the lubricant level within the casing be below the lower end of the pipe 19, this will permit air to flow upwardly through said pipe by way of the nipples 17 and 6 into the tank 1, thereby permitting the lubricant to flow by gravity downwardly through the nipples 7 and 14 and pipe 16 into the casing, but as soon as the lubricant level reaches the lower end of the pipe 19, this will stop the flow of air through the latter pipe, and thereby stop the flow of lubricant, the flow of lubricant being established whenever the level within the casing lowers below the pipe 19—i. e., if the valve 15 is opened. This maintains the lubricant level normal within the casing, until the supply of lubricant in the tank 1 is exhausted, the tank 1 being readily refilled, and containing sufficient lubricant to supply the crank casing for an extended period. This eliminates the frequent refilling of the crank casing according to the prevailing method of pouring the lubricant therein from time to time. In some cases, when there is a violent agitation of the lubricant within the crank casing, so that air might be admitted into the pipe 19, even though there is sufficient lubricant in the casing, it is preferable to close the valve 15 and, therefore, prevent the flow of lubricant from the tank into the casing, when the engine is in operation, the valve 15 only being opened when the engine is at rest, to thereby supply lubricant thereto if necessary.

From the foregoing, the advantages and attributes of the present invention will be apparent to those conversant in the art, and further explanation is not deemed necessary.

Having thus described the invention, what is claimed as new is:—

1. A lubricant supplying device, embodying in combination with the crank casing of an engine, of a lubricant reservoir at a higher level, a lubricant outlet connection connected to the reservoir adjacent to the lower portion thereof, an air inlet connection connected to the reservoir adjacent to the upper portion thereof, a gage between said connections for indicating the level of lubricant in the reservoir, a lubricant conducting pipe connected at its upper end to the lubricant connection and at its lower end to the crank casing below the lubricant level, and an air pipe connected at its lower end to the crank casing at the lubricant level and at its upper end to the rear connection of the reservoir.

2. In a lubricant supplying device, the combination with a crank casing of an automobile engine and a supporting member, of a lubricant reservoir at one side of said supporting member, a lubricant nipple connected to the reservoir adjacent to the bottom portion thereof and extending through the supporting member, an air nipple connected to the reservoir adjacent to the upper portion thereof and extending through the supporting member, disks connected to said nipple at the opposite side of the supporting member, a gage tube between said heads, a lubricant pipe connected at its upper end to the lowermost head and at its lower end to the crank casing below the lubricant level, and a second pipe connected at its lower end to the crank casing at the lubricant level and at its upper end to the upper head.

In testimony that I claim the foregoing as my own, I have hereto affixed my signature in the presence of two witnesses.

JAMES C. WILLIAMSON.

Witnesses:
Ivy E. Simpson,
Philomena A. Rockelli.